United States Patent [19]

Joyner

[11] Patent Number: 4,730,964

[45] Date of Patent: Mar. 15, 1988

[54] WHEELCHAIR RESTRAINT SYSTEM

[76] Inventor: Albert W. Joyner, 3390 Fox Lake Rd., Titusville, Fla. 32780

[21] Appl. No.: 930,414

[22] Filed: Nov. 14, 1986

[51] Int. Cl.⁴ .............................................. B60N 1/02

[52] U.S. Cl. .................................. 410/23; 296/65 A; 280/289 WC

[58] Field of Search ........................ 410/4, 7, 23, 51, 3, 410/30, 52, 2, 66, 77, 10, 15; 296/65 R, 65 A, 63, 1 F; 280/289 WC, 650, 242 WC

[56] References Cited

U.S. PATENT DOCUMENTS

| | | | |
|---|---|---|---|
| 3,955,847 | 5/1976 | Schlowitz | 410/4 |
| 4,257,644 | 3/1981 | Stephens | 296/65 R |
| 4,265,478 | 5/1981 | Korsgard | 296/65 R |
| 4,389,056 | 6/1983 | Tenniswood | 296/65 R |
| 4,623,289 | 11/1986 | Apostolos | 410/7 |

FOREIGN PATENT DOCUMENTS

| | | | |
|---|---|---|---|
| 2467734 | 5/1981 | France | 280/242 WC |

*Primary Examiner*—Robert B. Reeves
*Assistant Examiner*—Frank Williams

[57] ABSTRACT

An electromechanical system for securing a wheelchair to the floor of a transportation vehicle. The system is operable by a wheelchair encumbent or vehicle driver through the use of a multiple position switch which controls a motor actuated tie down hook and a pair of adjustable chocks so that the wheelchair wheels are secured directly to the vehicle floor with the wheelchair remaining in a horizontal position.

5 Claims, 21 Drawing Figures

WHEELCHAIR RESTRAINT SYSTEM

BACKGROUND OF THE INVENTION

Persons travelling in wheelchairs require specialized vehicle restraint systems which permit safe and comfortable movement whether the person is a passenger or operator of the transportation vehicle. In the past, several mechanical tiedown systems have been developed for use by wheelchair-bound vehicle drivers and passengers. The earliest systems were manually operated and required that a wheel chair bound person be assisted in securing the wheel chair to the vehicle. Such arrangements have been disclosed by Schiowitz in U.S. Pat. No. 3,955,847 and Stephens in U.S. Pat. No. 4,257,644. Korsgaard developed a lever operated latching device (U.S. Pat. No. 4,265,478) which could be engaged by a wheelchair occupant having use of only one hand. However, the Korsgaard invention relied upon a special temporary wheel chair for use during transportation and further required more than one latching device for complete security.

More recently, Tenniswood in U.S. Pat. No. 4,389,056 has developed a motorized tie-down system which incorporates a frame having triangularly shaped plates into a standard wheel chair. This frame, including two removable transverse rod members which restrict the folding of the wheelchair, is anchored to the vehicle floor by a motor actuated device which hooks the transverse rod members and elevates the front and rear wheels above the vehicle floor. In an alternative embodiment, the large rear wheels of the chair are positioned in sloping wheel wells located beneath the vehicle floor. In addition to the inclusion of large structural plates, the latching design disclosed by Tenniswood requires that numerous hooks engage the transverse rod members which span the plates in order to secure the wheelchair.

While the prior art includes systems for automatic securement of wheelchairs by wheelchair-bound persons, such systems unduly complicate the standard wheelchair with apparatus affecting the ease of portability and cost. Furthermore, prior motorized restraint systems tilt the wheelchair with respect to the vehicle floor and require the movement of the wheelchair over a platform or into wheel wells for securement.

SUMMARY OF THE INVENTION

Among the several objects of the present invention may be noted an improved electromechanical restraint system for transportation of wheelchair incumbents in vehicles of all types; the provisions of such improved system in which the incumbent can fully control restraint operations; the provisions of such an improved system including a single automated tie-down mechanism suitable for both electric wheel chairs and foldable wheel chairs, the mechanism comprising a simple latching device which connects to a tie-down bracket which is bolted on an electric wheelchair or an adjustable bracket which can be repositioned when a nonelectric wheelchair is to be folded; the provision of such an improved restraint system in which the wheelchair remains level with respect to the vehicle floor during travel; the provision of such a restraint system including adjustable chocks to secure the wheelchair in place; the provision of such a restraint system in which the wheelchair is positively secured against motion resulting from forces commonly encountered during normal vehicle maneuvers and during vehicle collisions; the provisions of such a restraint system in which the component parts utilized therein are simple in design, economically manufactured and easily assembled without specialized equipment, thus enabling installation of the restraint system with common tools. These as well as other objects and advantageous features of the present invention will be in part apparent and in part pointed out hereinafter. The invention is suitable for efficient and safe transportation of wheelchair-bound drivers and passengers in all types of transportation vehicles including highway vehicles, airplanes, trains and boats.

With reference to FIGS. 1–5, the inventive apparatus generally operates as follows. With an electrically powered actuator piston 26 fully extended, hinged tie-down assembly 42 is in a horizontal position on the vehicle floor for loading a wheelchair 10, 11. After the wheelchair encumbent positions the chair with each rear wheel against rear chocks 12, the encumbent moves a three position switch from a center "off" position to a "retract" position in order to retract the piston through a mid-position to a fully retracted position. In the mid-position the piston causes tie-down arm 46 to rotate into a vertical position, passing hook 40 over tie-down bracket 16, 18 which is attached to the wheelchair and causing front chocks 60 to elevate so as to block the front of the rear wheels in position and restrain the wheelchair from rolling forward. Movement of the piston to the fully retracted position causes hook 40 to latch the tie-down bracket 16, 18 securely. Movement of the switch to an "extend" position fully extends the piston thus releasing the tie-down hook and lowering the front chocks. Switch 22 is spring loaded so it always returns to the center "off" position when released.

DETAILED DESCRIPTION OF THE PREFERRED EMBODIMENT

Figures 1A, 1B, 2A:
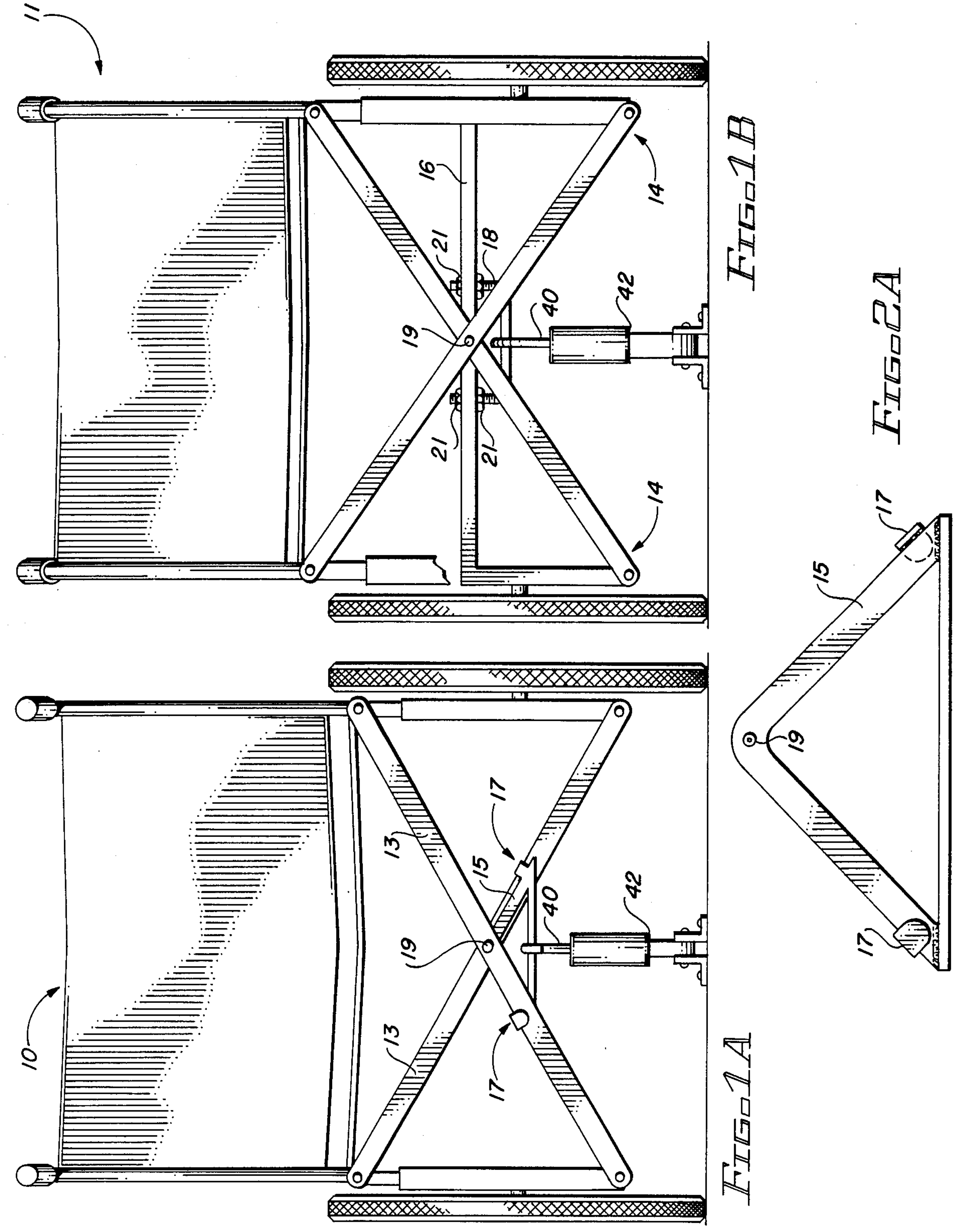
FIG. 1A illustrates in rear perspective a foldable wheel chair suitable for combination with the invention restraint system.
FIG. 1B illustrates in a cut away view frame and tiedown brackets mounted on an electric wheel chair suitable for combination with the inventive restraint system.
Figure 2B:
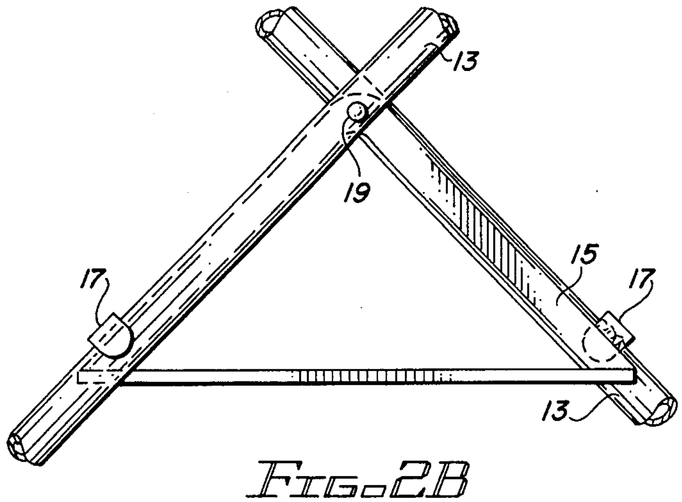
FIG. 2(A–C) illustrate attachment of a tie-down bracket to the cross-braces of a foldable wheelchair.
FIG. 2D illustrates attachment of a tie-down bracket and a frame bracket to the cross-braces of an electric wheelchair.
Figure 2C:
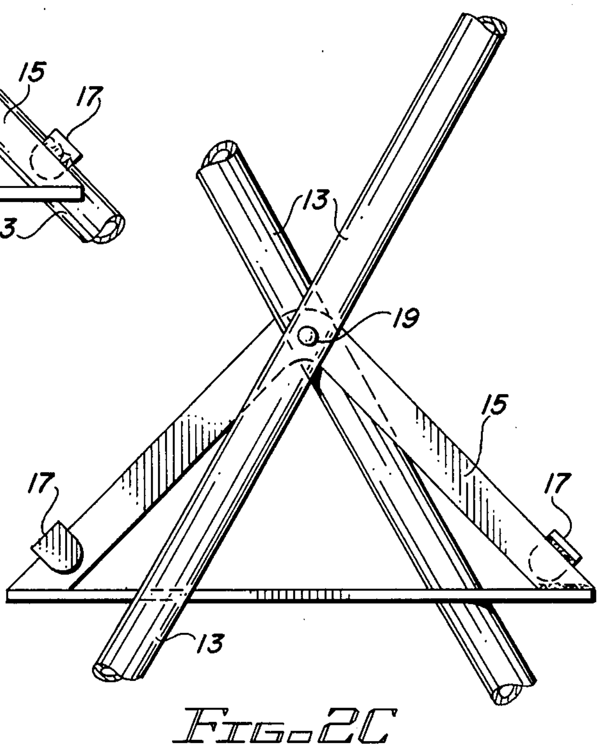
Figure 2D:
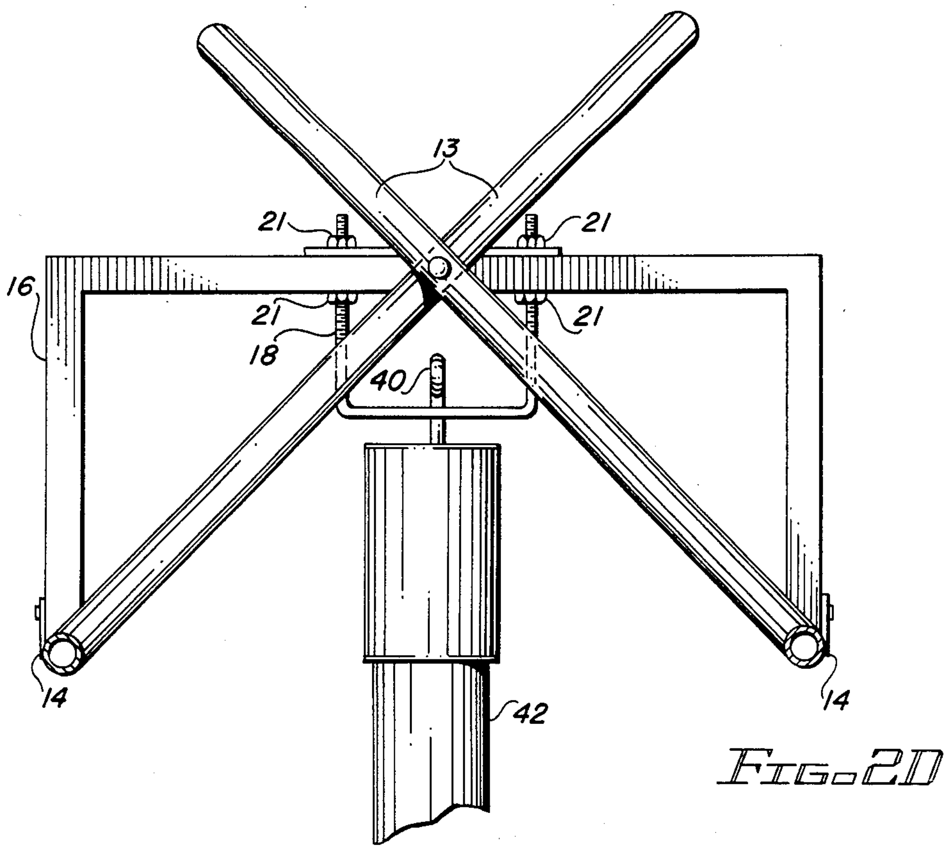

Referring now to FIG. 1A, a foldable wheelchair 10 is shown in perspective view. As more fully described in FIGS. 2(A–C), attached to the cross-braces 13 of foldable wheelchair 10 is a triangular shaped adjustable tie-down bracket 15 connected to the cross-braces by bolt 19. A pair of tabs 17 which curl around the cross-braces are used to secure bracket 15 to cross-braces 13 during tie-down operation. A first tab is on the front side of bracket 15 while a second tab is on the rear side of the bracket. Referring now to FIGS. 1B and 2D, there are illustrated frame bracket 16 and tie-down bracket 18 mounted on electric wheelchair 11 in order to effect the invention. Tie-down bracket 18 is attached at the center of frame bracket 16. Tie-down bracket 18 may be formed from a threaded U-bolt and attached to bracket 16 by nuts 21. Bracket 16 is bolted or otherwise attached at positions 14 as well as with bolt 19 to cross-braces 13 of electric wheelchair 11 as illustrated in FIG. 2D. In each case the tie-down bracket 15 or 18 functions as a latching bar for retractable tie-down hook 40 to engage and exert a downward force on a wheelchair.

Figure 3A:
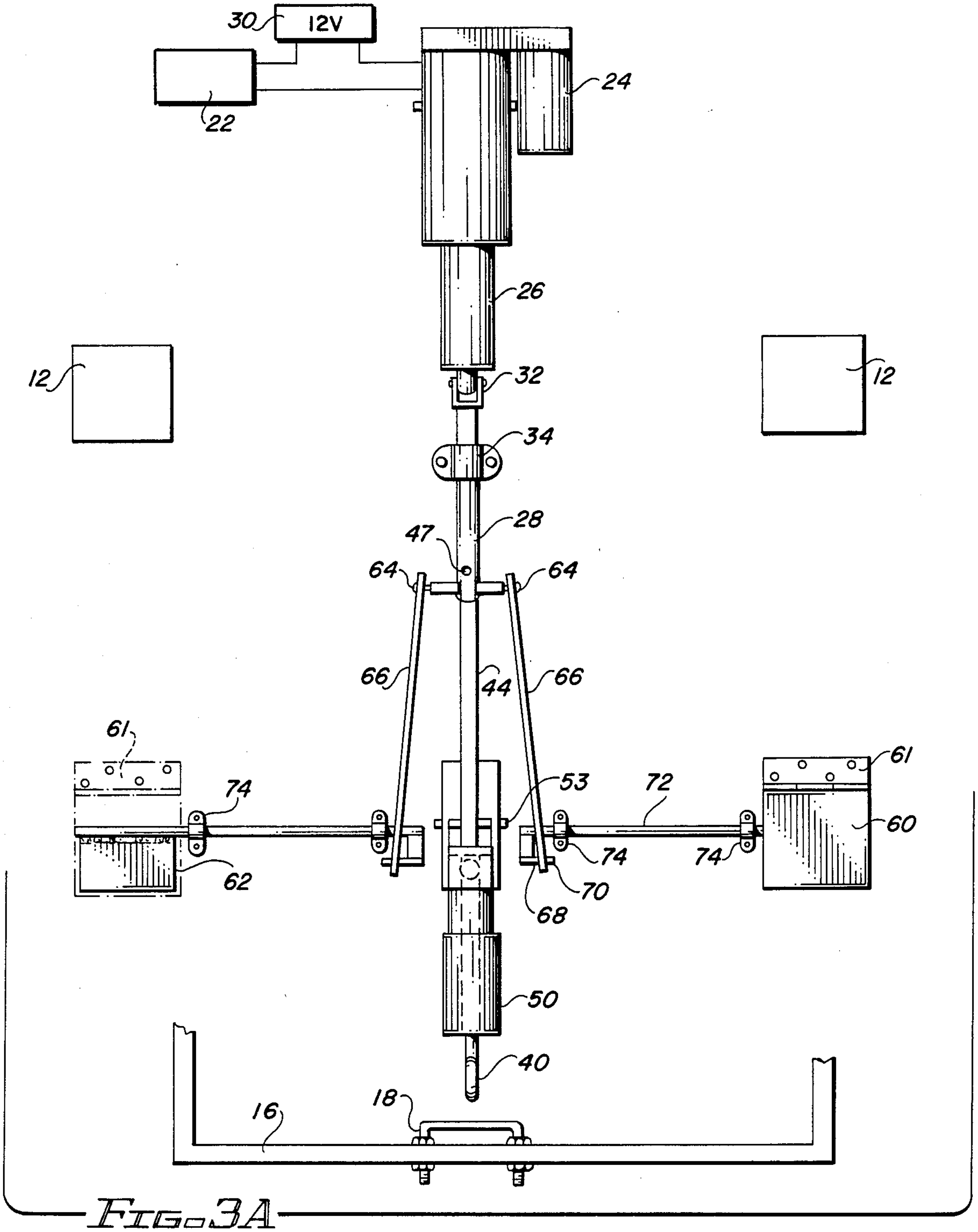
FIG. 3A is a plan view of the inventive restraint system.
Figure 3B:
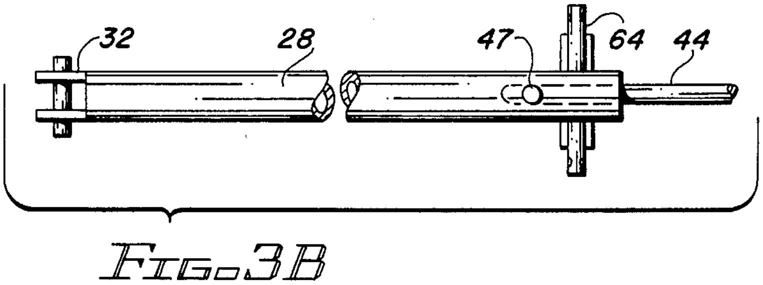
FIG. 3B illustrates in detail a portion of the inventive restraint system.
Figure 3C:
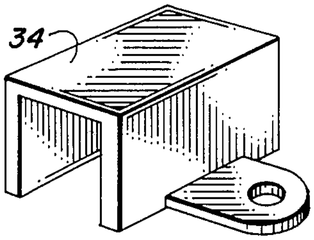
FIG. 3C is a perspective view of a guide.
Figure 4A:
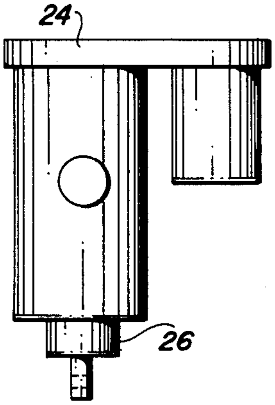
FIGS. 4(A–C) illustrate the three positions of an actuator piston.
Figure 4B:
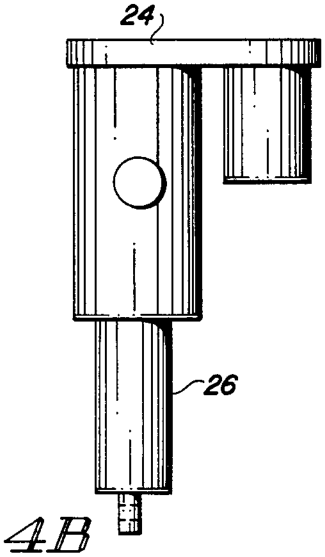
Figure 4C:
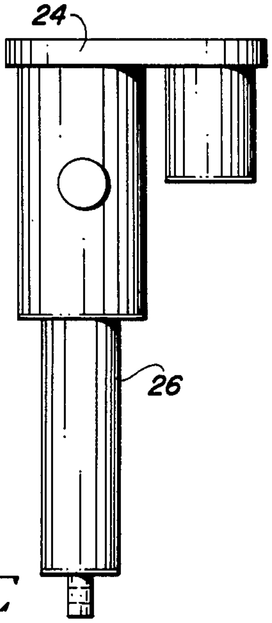

Referring now to FIGS. 3, in the preferred embodiment a hand held three position double pole-double throw (DPDT) switch 22 well known in the art is used for complete electrical control of the automatic wheelchair restraint system. The switch is connected to a battery powered electromechanical actuator 24 by which the wheelchair encumbent or vehicle driver operates tie-down hook 40 and a pair of adjustable front chocks 60. The switch 22 is used to engage the actuator 24 to a 12 volt battery 30. If the inventive wheel chair restraint system is used in an automotive vehicle the switch may be connected to the vehicle's battery. An actuator piston 26 is connected to a box iron extension rod 28 by means of a clevis and pin assembly 32. Retractable actuator piston 26 is controllable by switch 22 so that it may move from a fully retracted position (FIG. 4A) through an intermediate position (FIG. 4B) to a fully extended position (FIG. 4C). Corresponding movement of extension rod 28 is restricted by a guide 34 to the direction of motion of the actuator piston (See FIGS. 3C and 7). Referring also to FIG. 5 the other end of extension rod 28 is coupled to tie-down assembly 42 by cable 44. Cable 44 is securely wrapped around tie-down bolt 47 at one end of the extension rod. As illustrated in FIG. 5 tie-down assembly 42 comprises a hollow "L" shaped bracket 48, wherein cable 44 is secured to the lower portion of hook 40.

Tie-down arm 46 of "L" bracket 48 includes a retractable sleeve 50. Arm 46 is rotatable about a pivot pin 52 so that when actuator piston 26 fully retracts in combination with extension rod 28 and cable 44, sleeve 50 and hook 40 swing from a horizontal position mode for loading the wheelchair to a vertical position mode for securement as illustrated in FIG. 5C. Movement of tie-down assembly 42 from a vertical to a horizontal position is had when piston 26 is fully extended so that there is no cable tension. In this configuration gravity simply causes tie-down arm 46 to swing downward about its pivot pin 52. As the actuator piston retracts through a mid-position, cable tension develops causing tie-down arm 46 to move from a horizontal position to an upright position about the pivot pin 52. The pivot pin is mounted in brackets 54 located on each side of tie-down assembly 42 and secured to the vehicle floor by bolts 56. Cable roller 53 located interior to "L" bracket 48 provides for smooth movement of the cable as it pulls tie-down arm 46 into the vertical position.

Figure 5A:
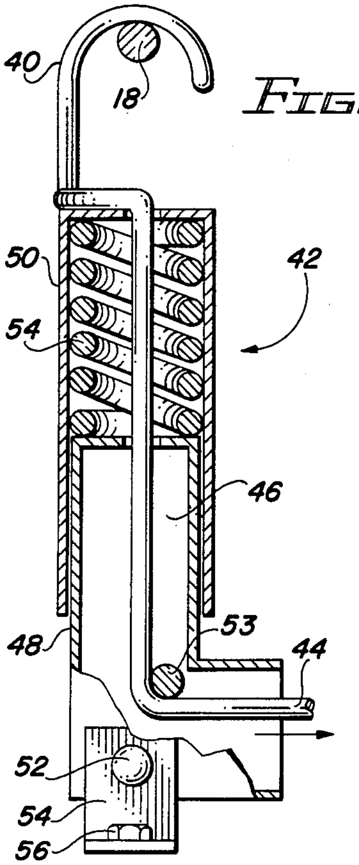
FIGS. 5(A–C) are side perspective views of the tie-down assembly.
Figure 5C:
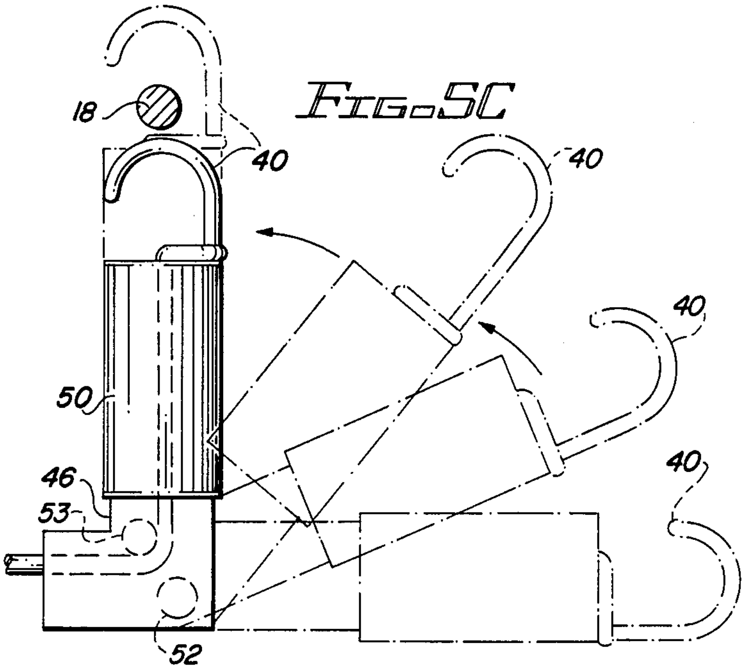
Figure 5B:
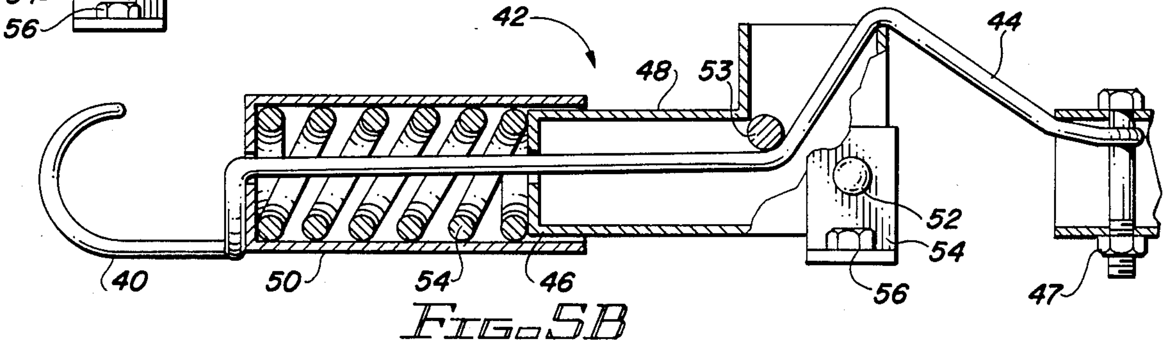
Figure 6A:
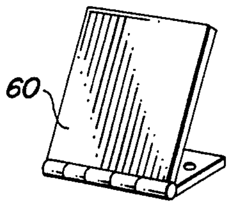
FIGS. 6(A–E) illustrate front and rear chocks and the mechanical linkage and components associated with the adjustable front chocks.
Figure 6B:
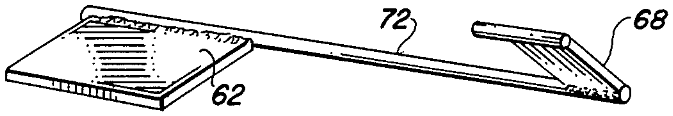
Figure 6D:
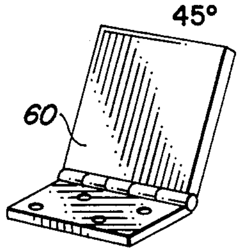
Figure 6C:
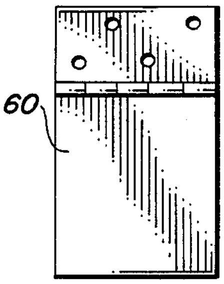
Figure 6E:
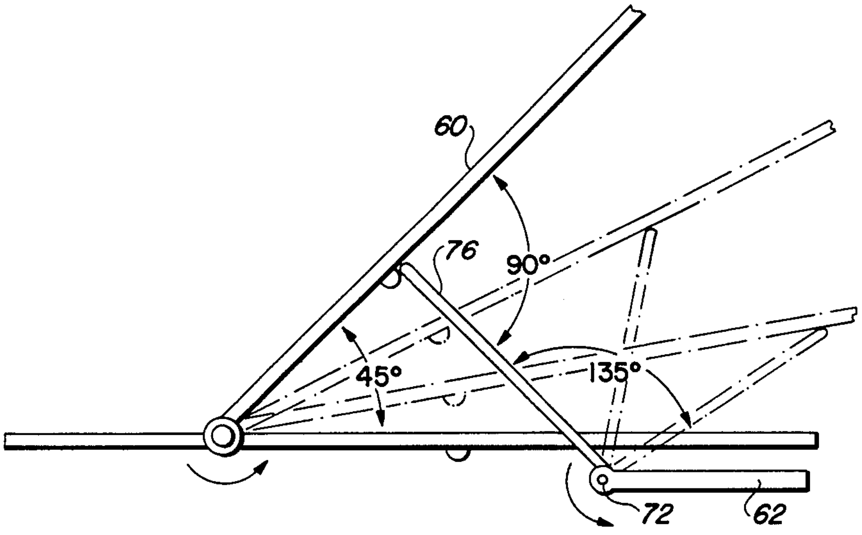
Figure 7:
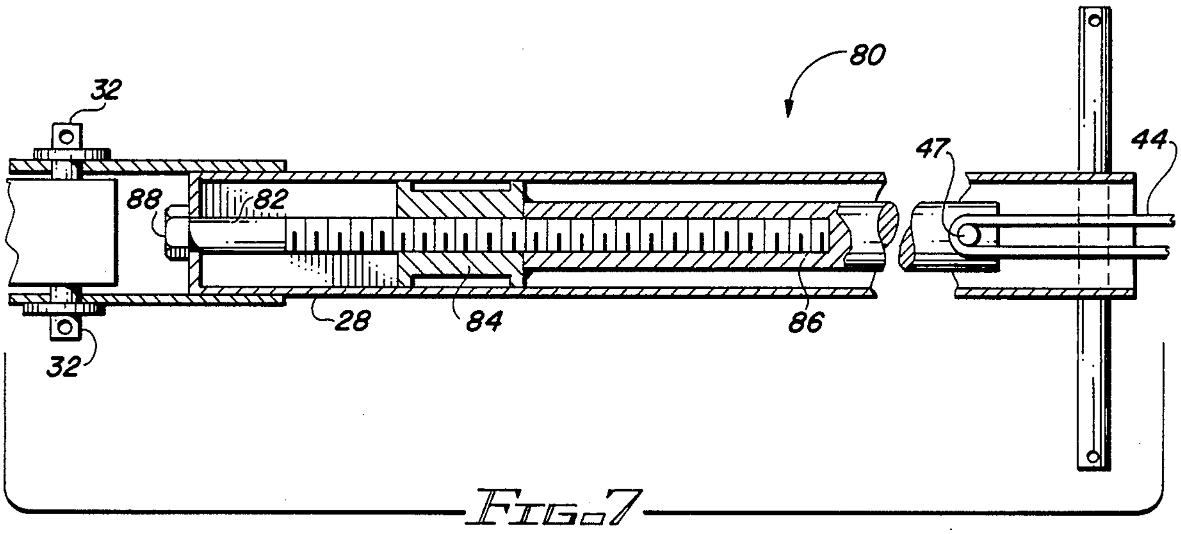
FIG. 7 illustrates the wheelchair tie-down cable adjustment assembly.

As illustrated in FIGS. 5A and 5B, retractable sleeve 50 is spring-loaded. With hook 40 attached to the sleeve at one end of arm 46, when a coil spring 54 located interior to sleeve 50 is relaxed the sleeve is extended so that hook 40 is in a position of maximum displacement from tie-down arm 46. The cable tension is adjustable by cable adjustment assembly 80, FIG. 7, so that hook 40 is fully displaced when actuator piston 26 is in either its most extended position or in its mid-position. When the retracting piston reaches a fully retracted position, the cable tension is greater than the opposing spring force thus retracting hook 40 in order to exert a downward force on tie-down bracket 15, 18. With the wheelchair in place, rear chocks 12 and adjustable front chocks 60 are situated in front of the rear wheels of the wheelchair in order to restrain forward and rearward motion when the wheelchair is secured by hook 40. A rear chock 12 is illustrated in FIG. 7. With reference to FIGS. 3 and 6, movement of front chocks 60 is effected by the turning of chock lever pates 62. On each side of cable tie-down bolt 47 a pin and bushing combination 64 connects extension rod 28 to first ends of two chock lever arms 66. The other end of each chock lever arm is connected to a chock lever bracket 68 by pin and clip assemblies 70. As illustrated in FIG. 6B each chock lever bracket 68 is attached to a first end of a chock lever rod 72. The lever rods are rotatably secured to the floor by pairs of rod brackets 74 so that movement of actuator piston 26 causes each chock lever rod 72 to rotate a chock lever plate 62 attached to the second end of each chock lever rod. With reference to FIGS. 6(C–E), front checks 60 are hinged assemblies which are boltable to the vehicle floor. When piston 26 is fully extended the chock lever brackets 68 rest on the vehicle floor. As the piston moves through a mid-position to a fully retracted position, the chock lever arms 66 rotate brackets 68, lever rods 72 and lever plates 76 through a 135° angle as illustrated in FIG. 6E. As the lever plates rotate front chocks 60 are pivotally raised from flat positions on the vehicle floor through 45° angles about their hinge points.

Applicants invention includes a cable adjustment assembly 80 illustrated in FIG. 7 for adjusting cable tension when hook 40 is engaged with tie-down bracket 15 or 18 (FIGS. 1). In addition, both hook movement and swinging of tie-down assembly 42 can be coordinated with the raising and lowering of front chocks 60 by cable adjustment. The cable adjustment assembly 80 is located interior to box iron extension rod 28. Adjacent clevis and pin assembly 32 a machine screw 82 passes through one end of extension rod 28 and connects into one end of an internally threaded coupler 84. Coupler 84 includes a hollow extension 86 which accepts machine screw 82 as it is turned into the coupler. Adjacent the second end of the coupler cable tie-down bolt 47 passes through both hollow extension 86 and extension rod 28 so that coupler 84 is secured in place. By turning the head 88 of machine screw 82, the cable tension is varied.

The invention has been described in a preferred embodiment applicable to both foldable wheelchairs and electric wheelchairs, but it should be understood that the foregoing description is by way of illustration of the inventive restraint system and that the invention is not limited thereto. Alternative constructions which incorporate the inventive features disclosed herein will become apparent to those skilled in the art in view of my disclosure and, accordingly such changes may be had without departing from the spirit of the invention or from the scope thereof as set forth in the claims which follow.

What is claimed is:

1. An automatic tie-down restraint system for safely securing a person in a wheelchair while traveling in a motor vehicle, the wheelchair having a pair of front wheels and a pair of rear wheels, said automatic tie-down restraint system comprising:

(a) coupling means adapted to be attached to the frame of the wheelchair for coupling the wheelchair to the motor vehicle;

(b) retractable engaging means including a retractable arm and a hook secured to said arm said arm rotatable from a horizontal position on the vehicle floor to a vertical position for engaging said coupling means in order to secure the wheelchair to the floor of the motor vehicle;

(c) rear chock means adapted to be attached to the floor of the motor vehicle for restraining rearward motion of the wheelchair;

(d) adjustable restraint means cooperating with said retractable engaging means for restraining forward motion of the wheelchair when said retractable engaging means is engaged to said coupling means; and (e) power actuating means for operating said engaging means in order to secure the wheelchair to the floor of the motor vehicle and in order to selectively release the wheelchair, said power actuating means including an electromechanical actuator, a multiple position retractable piston movably coupled with said actuator, an extension rod, a clevis and pin assembly connecting said piston to one end of said rod, a cable coupling said retractable arm to the other end of said extension rod, connecting means for operatively coupling said retractable engaging means to said adjustable restraint means so that the wheelchair can be simultaneously secured to the floor and restrained from forward motion; and (f) means for activating said electromechanical actuator and for controlling said retractable engaging means.

2. The automatic tie-down restraint system of claim 1 wherein said connecting means comprises:

(a) two chock lever arms;

(b) a pin and bushing assembly coupling each chock lever arm to an opposite side of the second end of said extension rod;

(c) two chock lever rods each including at one end a bracket for rotating each rod and a chock lever plate at the other end for adjusting said adjustable restraint means;

(d) a plurality of floor brackets rotatably securing each lever rod to the vehicle floor; and (e) two pin and clip assemblies each connecting one of the two brackets to one of the chock lever arms.

3. The automatic tie-down restraint system of claim 2 wherein said adjustable restraint means comprises two hinged assemblies secured to the vehicle floor, each positioned to lay above one of the chock lever plates so that rotation of the chock lever rods and lever plates results in pivoting of said chocks from a horizontal position through an angle of 45° about their hinge points.

4. The automatic tie-down restraint system of claim 2, wherein the wheelchair is a foldable wheelchair having a set of foldable cross-braces, the automatic tie-down restraint system further comprising tie-down bracket means, securable to the foldable cross-braces of the foldable wheelchair, for releasable engagement with said hook.

5. The automatic tie-down restraint system of claim 2, wherein the wheelchair is an electric wheelchair having cross-braces, the automatic tie-down restraint system further comprising tie-down bracket means, securable to the cross-braces of the electric wheelchair, for releasable engagement with said hook.

* * * * *